Sept. 11, 1973   D. W. AKERSON ET AL   3,758,357

MAKING MOLDED FIBER BOARD

Filed Aug. 11, 1971

INVENTORS
DAVID W. AKERSON
DUER L. MILLER

BY

ATTORNEY

United States Patent Office 3,758,357
Patented Sept. 11, 1973

3,758,357
MAKING MOLDED FIBER BOARD
David W. Akerson, Roseville, Minn., and Duer L. Miller, Deerfield, Ill., assignors to Conwed Corporation
Filed Aug. 11, 1971, Ser. No. 170,807
Int. Cl. B27m 1/02; B31f 1/36
U.S. Cl. 156—196             1 Claim

ABSTRACT OF THE DISCLOSURE

A method of molding a curved or other like form from a flat wood fiber insulation board containing at least 5% starch is disclosed. The method requires wetting with water at least one side of the board prior to the molding step.

---

Molded wood fiber products such as chair backs, trays, automotive interior panels, toys and the like are well known.

Such molded wood fiber products have been produced by a variety of methods including molding the loose wood fibers together with a binder such as a phenolic resin or urea-formaldehyde resin in a hot press. In such a method the wood fiber may be in a blanket or low density form and have the unactivated resin included therein.

Still another method of molding is to soak hardboard in water thoroughly and then to mold the same in a hot press.

The present invention is directed to the use of the relatively low density wood fiber board commonly referred to as insulation board as the material to be molded.

One object of the invention is to provide a relatively low cost handleable and shippable product for use in a molding operation.

Another object of the invention is to produce a molded wood fiber product having the inherent physical property advantages of insulation board including sound absorption, insulating value for heat, light weight, and the like.

These and other advantages of the product and method will be apparent to those skilled in the art from the following description and drawings in which.

Insulation board has been produced for a considerable number of years and used for a wide variety of products including decorative and sound absorptive ceiling tile and board, wall paneling, house sheathing, packaging material, and insulation material. Such product is generally produced on a Fourdrinier or cylinder machine from a dilute slurry of wood fibers. A dilute slurry is flowed upon a moving endless screen where the water is removed by gravity and vacuum and the fibers are felted into a wet mat which is then pressed and dried in an oven. The fibers are held together in part mechanically by their felted interrelationship and in large part by the natural "paper maker's bond" as is well known in the wood fiber and paper industry. Occasionally, for added strength when required such insulation board may have a very small quantity of starch (about 1 to about 3 percent) added thereto usually in the form of raw starch grains which are subsequently gelatinized in a humid section of the dryer and then dried to set the bond.

All of the above is well known in the art as a method of producing insulation board which is generally in the density range of about 15 to about 25 lbs. per cubic foot. Commonly, however, such insulation board is commercially produced in the much narrower range of from about 16 to about 20 lbs. per cubic foot with 17 lbs. per cubic foot being common. Such board sheets may then either be used as produced or painted and then applied for any of the number of applications referred to above. Such a product has adequate strength for its purposes having generally a modulus of rupture ranging from about 250 p.s.i. to about 400 p.s.i. Accordingly, it is very easy to break a piece (such as a 12" by 12" ceiling tile) in one's hands. As such, the product has not been considered as suitable for molding since attempts to mold the same result in almost immediate breakage of the board in the press. When hardboard (having a much higher density of say about 50 lbs. per cubic foot) is molded it is soaked for a considerable length of time, say 30 minutes, in water usually with a surfactant added to the water. In this way the board is softened enough to permit it to be molded in the hot press. Soaking of the conventional low density insulation board for a similar time; however, does not produce a moldable board since when attempts to mold such a board are made the board breaks. Substantially longer soaking only produces an unhandleabe board.

Applicants have found that by the use of at least 5% starch based upon the total weight of the product, an insulation board can be produced which may be molded merely by applying water in a coating-like layer to at least one side of the board as described below.

Figure 1:
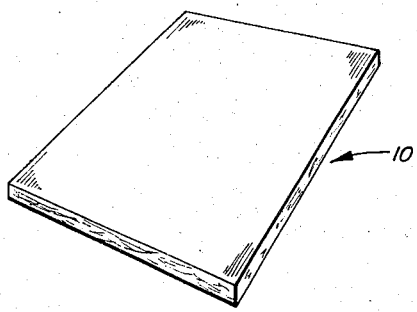
FIG. 1 is a perspective of a piece of flat insulation board.

As shown in FIG. 1 a flat insulation board 10, produced in a conventional manner on a Fourdrinier machine, pressed, and then dried in an oven is used. The preferred makeup of the board is set forth in Table I.

TABLE I

| | Parts by weight |
|---|---|
| Aspen fiber | 83 |
| Kraft fiber | 5 |
| Starch | 12 |

The aspen fiber used in the particular example of Table I was semi-chemically pulped aspen; however, raw refined fiber, or mixtures of semi-chemically pulped and raw refined fibers may be used. The kraft fibers in Table I were waste clippings from corrugated containers; however, other examples of suitable board have been manufactured and molded as described below which contained no kraft fibers. The starch was included in the furnish as raw starch grains (corn) and the starch was gelatinized in situ by utilizing a high humidity section at the beginning of the dryer. The board was subsequently passed through the dry section of the dryer to set the starch and dry the board. A suitable size such as that disclosed in the Olsen Pat. No. 2,754,206 was also included although the inclusion of this size has been found to be optional. If desired, the final dried product may have a thin top and bottom coating of cooked starch to prevent dusting during handling. Such coating is not, however, essential to the molding process.

Figure 2:
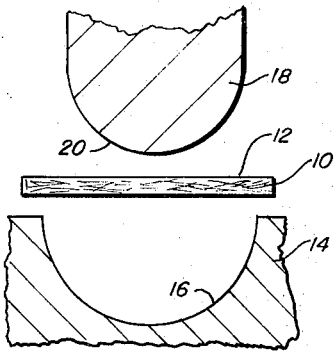
FIG. 2 is a partially schematic showing of a board in place in a hot press and ready for molding.

The dried insulation board 10 had a density of 18.5 lbs. per cubic foot and a thickness of ½". The board 10 was then coated on its upper surface 12 as shown in FIG. 2 with a thin layer of water to a quantity of 6 lbs. per thousand square feet of surface. This usage is somewhat less than that which would be experienced from using a conventional paint on a wall. The water film on the surface 12 may be provided by brushing, rolling, spraying, or any other suitable conventional mechanism (not shown) but spraying is preferred. The board 10 was then placed upon the female portion 14 of a hot press mold. Suitable heating mechanism such as electrical or steam heat was provided for the female mold portion 14 in conventional manner to heat the same to 350° F. In the experiments here referred to the internal curvature 16 of the mold 14 comprised a half cylinder section having a radius of 7½ in. although other radii and shapes may be utilized. The mating male mold portion 18 of the press had a curvature 20 complementary to that of the curvature 16 for the female mold 14 comprising, in cross-section, a half circle. The male mold, of course, was of lesser radius in order to accommodate the ½" board thickness. The male mold section 18 was also heated in like manner to 350° F.

Figure 3:
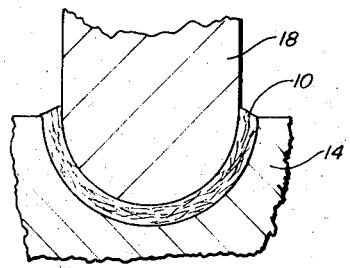
FIG. 3 is a view similar to FIG. 2 with the press fully closed.

The male mold 18 was moved downwardly toward the female mold 16 in conventional manner by means of an hydraulic press as is well known. The closure time for the press is approximately 2 minutes followed by approximately 5 to 10 seconds in closed position (as shown in FIG. 3). Finally the male mold was raised to permit removal of the molded part.

Figure 7:
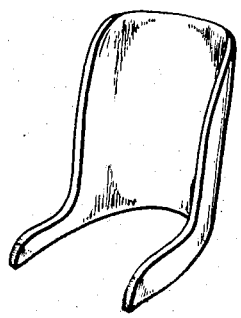
FIG. 7 is a showing of a typical molded part, a chair back, produced by the invention.

FIG. 7 shows a typical chair back as produced by the above described method although it will be appreciated that the specific FIGS. 2 and 3 are largely schematic and not directed to the formation of the particular chair back shown.

It has been found that the furnish of Table I may be varied in its starch content from 5 parts to in excess of 20 parts and the board 10 will still mold well. However, below a starch content of 5 parts the board tends to crack and break during the molding operation and will not produce a satisfactory wood fiber molded product. From variation of the starch content it has been found that generally the larger the starch content the stronger the board and the more readily it will mold. No surfactant is needed in the water that is used to wet the upper surface. Any water added much in excess of the above-mentioned amount of 6 lbs. per thousand square feet will simply run off and not be utilized.

Figure 4:
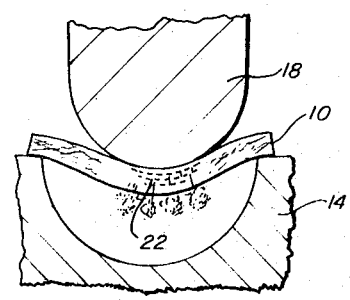
FIGS. 4–6 are enlarged views of a board in the process of being molded.
Figure 5:
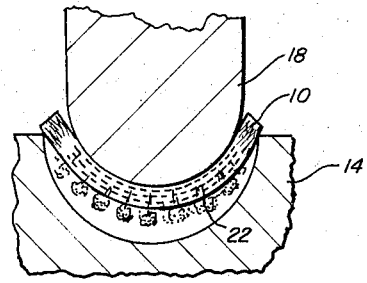
Figure 6:
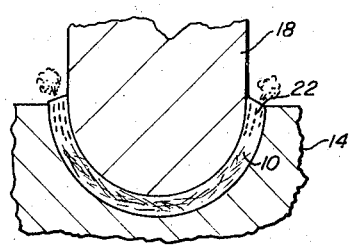

It is not known exactly by what mechanism such a board is moldable contrary to previous understanding and expectations. It is theorized, but not known, that the water is heated by the hot press male section 18 and driven as steam or vapor into the surface of the board ahead of the mold shape 18 as it descends thus softening the starch bond during the molding process as the board is bent. It is believed that this softening of the starch permits the board to be bent and molded while still retaining enough strength from the starch as to prevent breakage of the board. During continuation of the downward stroke as the steam (having softened the starch in the necessary area) is dissipated, the starch then resets from the heat of the mold with the board set in the new molded shape. An advancing line, believed to be the penetrating steam, can be seen at the edge of the board during the advance of the mold as illustrated in enlarged section in FIGS. 4–6. As shown in FIGS. 4–6 the steam or moisture line 22 advances ahead of the downwardly descending mold member 18 passing through the board at the central portion and outwardly towards the outer ends as the mold 18 descends.

By the time the mold 18 has reached its fully descended position it may almost immediately be retracted (5 to 10 seconds dwell time is preferred) without the necessity of drying the board completely in restraint since very little water has been added to the product and what small amount was applied to the surface has been converted to steam and driven into and throughout the board and ultimately dissipated.

In some applications it may be desirable to apply a laminate to either or both sides such as paper or plastic sheets or foils of metal laminated to the molded board for decorative or other purposes including additional strength. Generally, it will be found preferable to apply the laminate after molding of the board. In some circumstances, however, it may be advantageous to apply the laminate during the molding process, particularly if the laminate is to be applied to the back surface of the board (i.e. the surface facing the female mold). In such instances the required adhesive can be applied either to the laminate or to the board and then the board and laminate assembled in the press. The laminate will then be adhered to the board and the adhesive dried or set during the molding process. Since it is necessary that water be applied to the upper surface (i.e. the surface facing the male mold in the drawings) the upper surface is not as well adapted to such lamination during molding, though if the laminate is a metal foil then such an upper surface laminate is possible.

We claim:

1. A process for molding a curved or other like form comprising the steps:
    (a) forming a felted fibrous substantially rigid board of from 15 to 25 pounds per cubic foot density containing at least 5% of starch by weight dispersed within said board; and thereafter
    (b) applying water in a coating-like layer to at least one side of said board; and
    (c) permanently changing the geometric shape of said board by applying heat and pressure at a temperature which is sufficient to cause said water to change to steam, said steam being driven, at least in part, into said board as said pressure is applied to said board.

References Cited
UNITED STATES PATENTS

| | | | |
|---|---|---|---|
| 3,062,687 | 11/1962 | Camusi | 161—266 |
| 3,090,699 | 5/1963 | Bulson | 162—175 |
| 3,144,298 | 8/1964 | Hullinger et al. | 162—175 |
| 3,619,352 | 11/1971 | Bell | 162—175 |

WILLIAM J. VAN BALEN, Primary Examiner

U.S. Cl. X.R.

156—87, 245; 161—170, 266; 264—134, 324